United States Patent [19]
Neal

[11] 3,955,399
[45] May 11, 1976

[54] UNI-DIRECTIONAL METER PROVER APPARATUS

[75] Inventor: Jack R. Neal, Claremore, Okla.

[73] Assignee: Metric, Inc., Tulsa, Okla.

[22] Filed: June 17, 1974

[21] Appl. No.: 479,609

[52] U.S. Cl. .................................................. 73/3
[51] Int. Cl.² ........................................ G01F 25/00
[58] Field of Search .......................................... 73/3

[56] References Cited
UNITED STATES PATENTS

| | | | |
|---|---|---|---|
| 3,504,523 | 4/1970 | Layhe | 73/3 |
| 3,738,153 | 6/1973 | Simmons | 73/3 |

*Primary Examiner*—S. Clement Swisher
*Attorney, Agent, or Firm*—Dunlap, Codding & McCarthy

[57] ABSTRACT

The present invention relates to an improved uni-directional meter prover apparatus which includes a prover barrel having first and second ends, a piston disposed within the barrel which is propelled through the barrel by the flow of liquid therethrough, means for detecting the passage of the piston and comparing the volume of liquid displaced thereby with the volume of liquid measured by a meter being proved and means for transferring the piston from the second end of the prover barrel to the first end thereof. By the present invention, the first end of the prover barrel is positioned below the second end thereof and a piston transfer conduit is connected between the first and second ends of the prover barrel. First and second valve means are disposed within the transfer conduit for preventing liquid communication between the first and second ends of the prover barrel and for selectively retaining the piston therein. Means for selectively opening and closing the first and second valve means are provided so that the piston is caused to flow through the prover barrel from the first end to the second end thereof and then is transferred by gravity movement through the transfer conduit back to the first end of the prover barrel.

6 Claims, 5 Drawing Figures

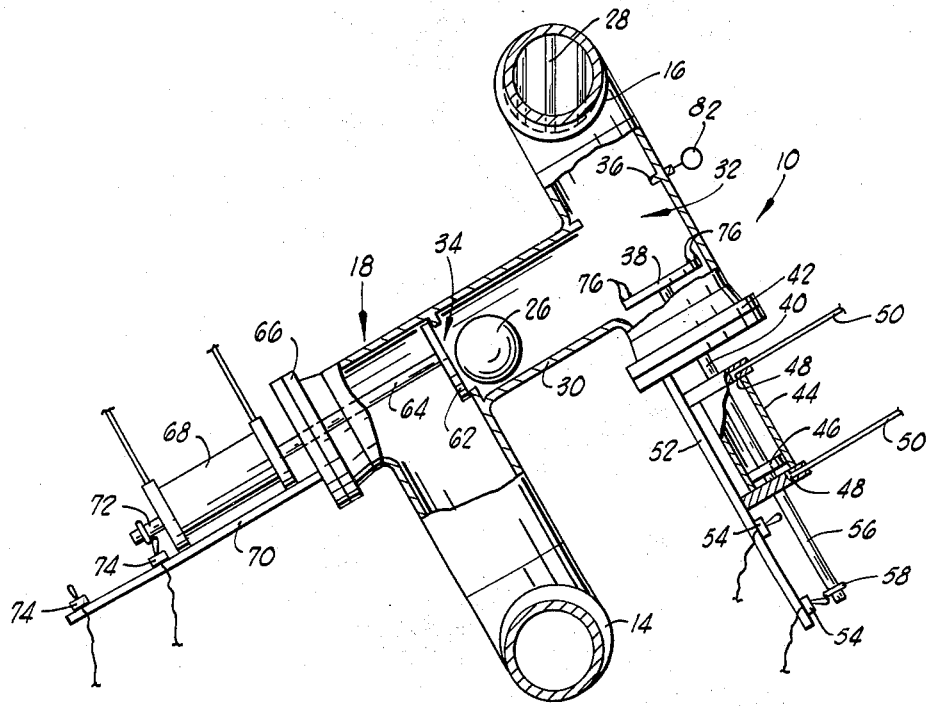
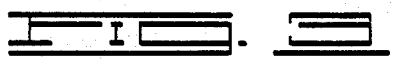
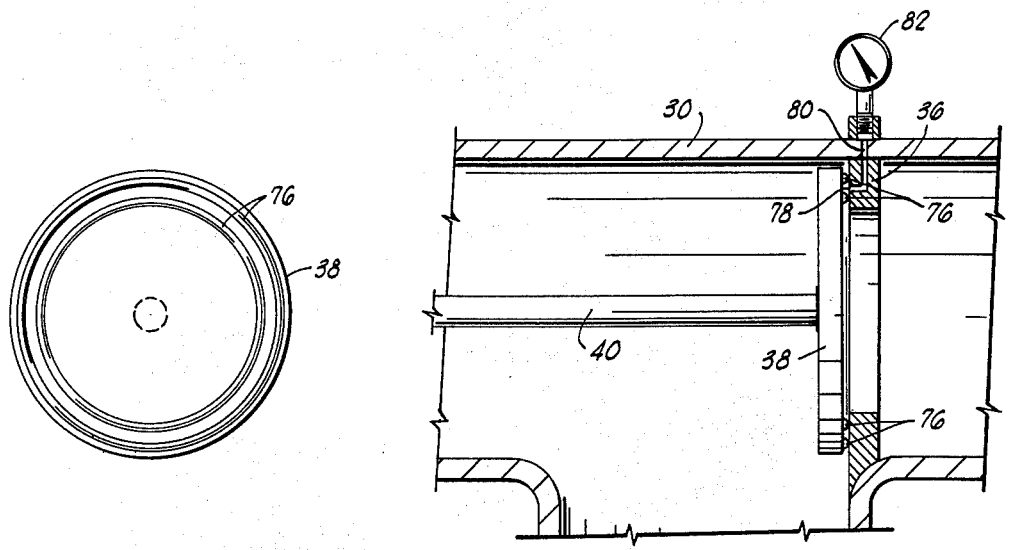

3,955,399

UNI-DIRECTIONAL METER PROVER APPARATUS

BACKGROUND OF THE INVENTION

1. Field of the Invention

The present invention relates generally to meter prover apparatus, and more particularly, but not by way of limitation, to an improved uni-directional meter prover apparatus of the type employing a prover barrel through which a piston is propelled by the flow of metered liquid.

2. Description of the Prior Art

Many various types of meter prover apparatus have been developed and used for proving the accuracy of liquid flow meters. Heretofore, prover apparatus have included a prover barrel or loop through which a piston is propelled by the flow of metered liquid. Means for accurately determining the passage of the piston through the loop are provided so that the known quantity of liquid displaced thereby can be compared with the reading of the meter being proved.

In uni-directional types of meter prover apparatus the flow of metered liquid and the piston are directed through the prover barrel in a single direction. An interchange connects the inlet and discharge ends of the prover barrel so that when the piston reaches the discharge end of the prover barrel it is transferred back to the inlet end thereof and the proving cycle is repeated. The transfer of the piston from the discharge to the inlet ends of the prover barrel must be accomplished in a manner such that when the transfer is completed and the piston is launched into the barrel, liquid communication between the ends of the barrel through the transfer system is positively prevented. In addition, means must be provided for retaining the piston between proving runs so that it can be launched into the prover barrel at the discretion of the operator of the apparatus.

While a variety of methods and apparatus for transferring flow propelled pistons from one end of a prover barrel to the other have been developed, such methods and apparatus have generally suffered from the disadvantage that they include complicated and elaborate apparatus, require a number of time consuming manual operations in order to complete the transfer and launching of the piston or are susceptible to leakage and bypassing of the metered liquid through the transfer system whereby inaccurate measurement results. By the present invention, an improved uni-directional meter prover apparatus is provided which is relatively simple, readily lends itself to automatic operation and achieves positive shutoff between the ends of the prover barrel prior to when the flow propelled piston is launched into the barrel.

SUMMARY OF THE INVENTION

The present invention relates to a uni-directional meter prover apparatus comprising a prover barrel having first and second ends, the first end being positioned below the second end thereof, and a piston disposed within the prover barrel which is moved through the barrel by the flow of liquid therethrough. A metered liquid inlet connection is attached to the first end of the prover barrel for introducing metered liquid into the barrel and propelling the piston therethrough, and a displaced liquid outlet connected is attached to the second end of the prover barrel for withdrawing liquid displaced by the piston therefrom. Means are attached to the barrel for detecting the passage of the piston through the barrel and comparing the volume of liquid displaced thereby with the volume of liquid measured by a meter being proved. A piston transfer conduit is connected between the first and second ends of the prover barrel for conducting the piston by gravity movement from the second end of the prover barrel to the first end thereof. First valve means are disposed within the transfer conduit for preventing liquid communication between the first and second ends of the prover barrel when closed, but allowing the passage of the piston by gravity movement when opened. Second valve means are disposed within the transfer conduit below the first valve means for retaining the piston when closed, but allowing the passage of the piston by gravity movement when opened, and means for selectively opening and closing the first and second valve means are attached thereto and to the transfer conduit.

It is, therefore, a general object of the present invention to provie an improved uni-directional meter prover apparatus.

A further object of the present invention is the provision of uni-directional meter prover apparatus which is of relatively simple design and construction and readily lends itself to automatic operation.

Yet a further object of the present invention is the provision of uni-directional meter prover apparatus which achieves a positive shutoff in the transfer system between the ends of the prover barrel prior to the launching of the flow propelled piston into the prover barrel thereby insuring accurate measurement.

Another object of the present invention is the provision of uni-directional meter prover apparatus which achieves long valve and valve seal service life and provides a positive and continuous visual indication of the quality of the seal obtained by the valve means.

Other and further objects, features and advantages of the invention will be apparent to those skilled in the art upon a reading of the description of preferred embodiments which follows when taken in conjunction with the accompanying drawings.

BRIEF DESCRIPTION OF THE DRAWINGS

FIG. 3 is a sectional view similar to FIG. 2;

FIG. 4 is an enlarged sectional view illustrating the valve means of the present invention; and FIG. 5 is an enlarged end view of a portion of the apparatus shown in FIG. 4.

DESCRIPTION OF THE PREFERRED EMBODIMENTS

Figure 1:
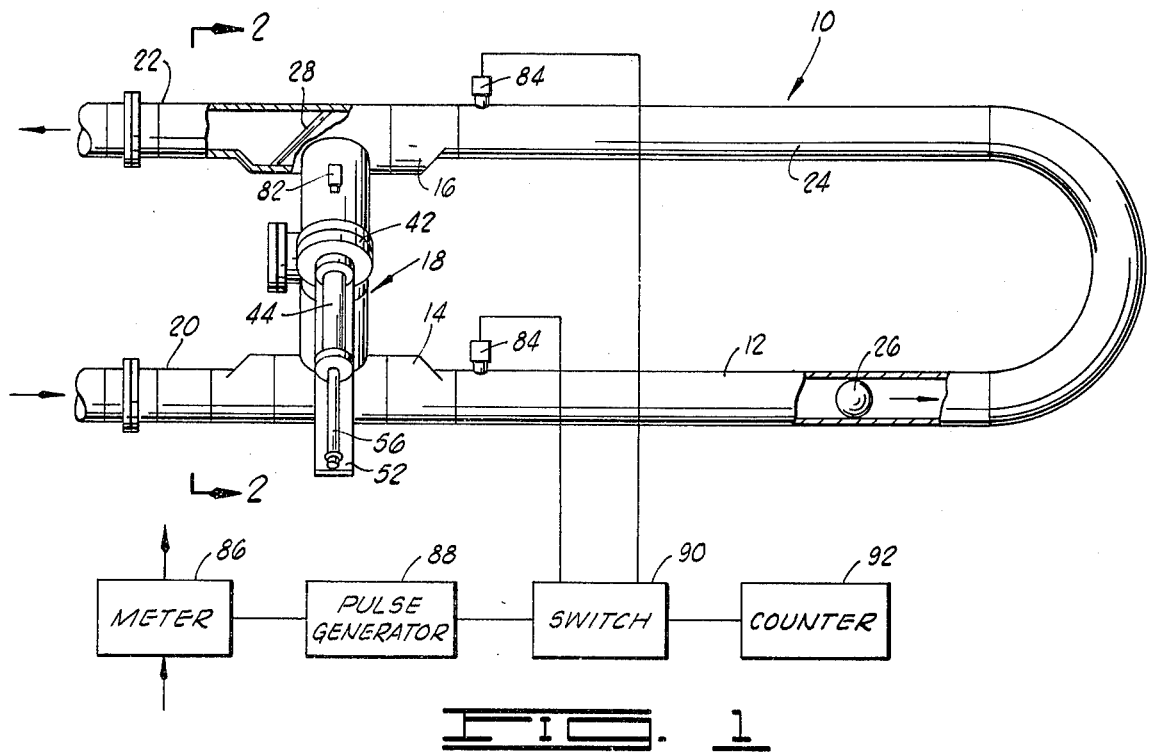
FIG. 1 is a side elevational view, partially in section, of the meter prover apparatus of the present invention.
Figure 2:
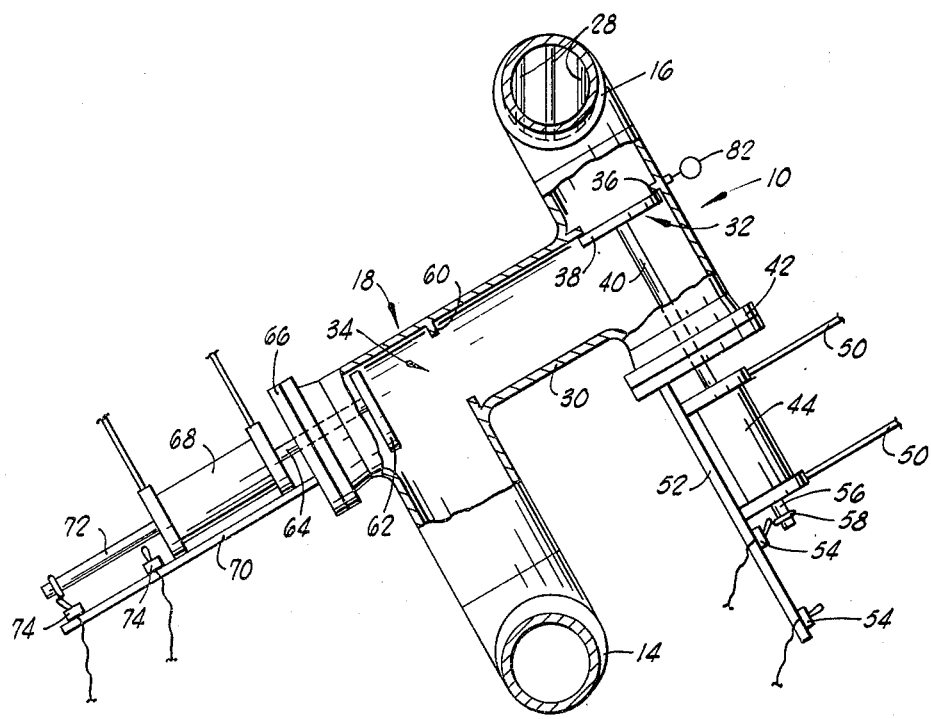
FIG. 2 is a sectional view taken along line 2—2 of FIG. 1.

Referring now to the drawings, and particularly to FIGS. 1 and 2, the improved uni-directional meter prover apparatus of the present invention is illustrated and generally designated by the numeral 10. The apparatus 10 basically comprises a U-shaped prover barrel 12 having first and second ends 14 and 16 respectively connected together by a piston transfer assembly generally designated by the numeral 18. A metered liquid inlet connection 20 is attached to the end 14 of the barrel 12 and a displaced liquid outlet connection 22 is attached to the end 16 thereof.

The first and second end portions 14 and 16 of the barrel 12 are enlarged and the elongated intermediate portion 24 thereof is of a smaller constant diameter. A piston 26, generally formed in the shape of a sphere, is disposed within the barrel 12 and forms a seal within the intermediate portion 24 thereof so that the piston is propelled through the barrel 12 by the flow of metered liquid therethrough.

The enlarged first end portion 14 of the barrel 12 receives the piston 26 when it is launched and the end portion 16 receives the piston after it has been propelled through the barrel. While within the enlarged portions 14 and 16, the piston 26 is bypassed by a portion of the liquid flowing through the barrel 12 so that the movement of the piston is slowed as compared to its movement through the intermediate portion 24. That is, when the piston 26 is launched into the enlarged end portion 14 it is smoothly propelled into the intermediate portion 24, and when the piston 26 reaches the enlarged end portion 16, the flow of liquid bypasses the piston slowing it down and allowing it to enter the piston transfer assembly 18 without disturbing or shutting off the flow of liquid through the barrel 12. As shown in FIGS. 1 and 2, a plurality of diagonally positioned deflector bars 28 are attached within the enlarged end portion 16 for deflecting the piston 26 downwardly and facilitating its entry into the piston transfer assembly 18.

The discharge or second end 16 of the prover barrel 12 is positioned above the inlet or first end 14 of the barrel 12, and the piston transfer assembly 18 is connected between the ends 14 and 16 of the barrel 12. More specifically, the piston transfer assembly 18 includes a transfer conduit 30 sealingly connected between the ends 14 and 16 of the barrel 12. The conduit 30 is of a size and is positioned so that the piston 26 passes therethrough by gravity movement.

First and second valve means, generally designated by the numerals 32 and 34 respectively, are disposed within the transfer conduit 30 for preventing liquid flow between the ends 14 and 16 of the barrel 12 and for retaining and selectively launching the piston 26 into the barrel 12.

The first valve means 32 include an annular plate 36 which is seal welded within the conduit 30 and positioned substantially transversely to the direction of gravity movement of the piston 26 upon its entry into the conduit 30. The conduit 30 is preferably S-shaped to accomodate the presently preferred arrangement of the valve means 32 and 34, but as will be readily apparent, the conduit 30 can take a variety of shapes and configurations so long as the piston 26 can move therethrough by gravity.

The annular plate 36 includes an annular seating surface on the lower side thereof and is of an internal diameter sufficiently large to permit the passage of the piston 26 therethrough. A disk closure member 38 is disposed within the conduit 30 below the annular plate 36 and includes an annular seating surface on its upper face for sealingly engaging the annular seating surface of the plate 36. The disk closure member 38 is positioned in a plane parallel to the plane of the annular plate 36 and is of a diameter larger than the internal diameter of the annular plate 36. An elongated actuating rod 40 is attached to the disk closure member 38 and extends through a wall of the conduit 30. Preferably, as illustrated in the drawings, the actuating rod 40 is slidably and sealingly positioned through a closure member 42 which can be opened to provide access to the internal portion of the conduit 30 and the first valve means 32. The rearward end of the actuating rod 40 extending through the closure member 42 is operably connected to an actuator 44. The actuator 44 can be any of a variety of hydraulic, pneumatic or electric cylinders or motors adapted to move the actuating rod 40 to alternate positions whereby the disk closure member 38 is in seated engagement with the annular plate 36, as shown in FIG. 1, or whereby the disk closure member 38 is a distance below the annular plate 36 sufficient to allow the passage of the piston 26 therethrough as shown in FIG. 3. Preferably, as best shown in FIG. 3, the actuator 44 is a conventional hydraulic cylinder having a fluid pressure responsive piston 46 disposed therein which is connected to the actuating rod 40. Hydraulic fluid introduction and withdrawal ports 48 are disposed within the ends of the cylinder 44 and are connected by hoses or conduits 50 to a conventional source of pressurized hydraulic fluid and control system (not shown). The cylinder 44 is attached to a mounting bracket 52 which is in turn attached to the closure member 42. Also attached to the mounting bracket 52 are a pair of conventional limit or toggle switches 54 which are tripped by an activating arm 56 attached to the rearward side of the piston 46 within the hydraulic cylinder 44. As will be understood, the ends of the cylinder 44 include conventional seal means which prevent leakage of hydraulic fluid around the actuating rod 40 switch activating arm 56, but permit the sliding movement thereof. The activating arm 56 includes a protruding annulet 58 attached to the end thereof for engaging and tripping the toggle switches 54. Thus, when the disk closure member 38 is moved by the actuator 44 into a position whereby it is in sealing engagement with the annular plate 36, the switch activating arm 56 is moved to the position shown in FIG. 2 whereby the annulet 58 trips the forward toggel switch 54 into the on position. When the actuator 44 moves the disk closure member 38 to the position whereby it is a distance below the plate 36 sufficient to allow the piston 26 to pass by gravity movement through the annular plate 36, the forward toggle switch 54 is in the off position and the annulet 58 of the arm 56 trips the rearward toggle switch 54 to the on position as illustrated in FIG. 3.

The second valve means 34 are identical to the first valve means 32 and include an annular plate 60 seal welded within the transfer conduit 30 and positioned substantially transversely to the direction of gravitational movement of the piston 26 through the conduit 30. The plate 60 includes an annular seating surface on the lower side thereof, and a disk closure member 62 is disposed within the conduit 30 having an annular seating surface for sealingly engaging the seating surface of the annular plate 60. The disk closure member 62 is connected to an actuating rod 64 the rearward end of which extends through a sealed closure member 66 attached to the conduit 30. An actuator 68 identical to the actuator 44 is mounted on a bracket 70 which is attached to the closure member 66. The actuator 68 is operably attached to the actuating rod 64 and includes a switch activating arm 72 extending rearwardly. A pair of toggle switches 74 is mounted on the bracket 70 so that the toggle switches 74 are engaged and tripped by the activating arm 72 when the disk closure member 34 is moved to open and closed positions.

Referring now to FIGS. 2 through 5, and particularly FIGS. 4 and 5, the disk closure member 38 of the first valve means 32 includes a pair of annular elastomer sealing members 76 attached to the seating surface thereof and positioned to contact the seating surface of the annular plate 36 when the disk closure member 38 is positioned adjacent thereto. The elastomer sealing members 76 can be attached to the disk 38 in any convenient manner such as by providing grooves in the face of the disk within which portions of the sealing members extend and are held.

The annular plate 36 includes one or more ports 78 in the annular seating surface thereof positioned to lie between the annular sealing members 76 attached to the disk closure member 38 when the disk closure member 38 is positioned in adjacent seated relationship thereto. The port 78 is connected to a passageway 80 disposed in the plate 36 and a side of the conduit 30 so that fluid pressure exerted through the port 78 is communicated to outside the conduit 30 by way of the passageway 80. A conventional pressure indicating gauge 82 is sealingly connected to the passageway 80 for visually indicating the fluid pressures exerted therein. As will be understood, the actuator 44 moves the actuating rod 40 and the disk closure member 38 the required distance between the open and closed position, and when closed the actuator 44 applies a continuous pressure on the disk 38 so that a fluid tight seal results between the disk 38 and plate 36.

Referring again to FIG. 1, a pair of piston detecting switch means 84 are attached to the barrel 12 for detecting the passage of the piston 26 through the barrel 12. The meter 86 being proved or calibrated by the apparatus 10 is provided with a pulse generator 88 which produces an electrical pulse output proportional to the measured flow of liquid through the meter 86. The output of the pulse generator 88 is connected in a conventional manner to a switch means 90 which is in turn operably connected to the piston detector means 84. The output of the switch means 90 is connected to a conventional counter 92. As the piston 26 is moved from one end of the prover barrel 12 to the other by the flow of metered liquid therethrough, it first engages one of the piston detector switches 84 to initiate the switch means 90 and the counting of the pulse output of the pulse generator 88 by the counter 92. When the piston 26 reaches the other of the detector switches 84 the count is stopped by the switch means 90.

The apparatus 10 can be portable such as by mounting it on a trailer or truck bed, or it can be permanently installed in a pipeline system, and either automatically or manually operated to prove one or more meters on a periodic basis. In either case, the metered liquid inlet connection 20 attached to the prover barrel 12 is connected to the conduit system containing the meter 86 downstream of the meter 86 so that metered liquid is caused to flow into the barrel 12 of the apparatus 10. The displaced liquid outlet connection 22 attached to the second end of the barrel 12 is also connected to the conduit system containing the meter 86 so that the metered liquid diverted through the apparatus 10 is returned to the conduit system. Generally, a permanent test manifold is provided in the conduit system containing the meter to be proved just downstream thereof for routing metered liquid through the test apparatus.

The toggle switches 54 and 74 and the second piston detector switch means 84 are preferably operably connected to a control panel (not shown) for controlling the operation of the first and second valve means 34, as will be described in detail hereinbelow.

OPERATION OF THE APPARATUS 10

Referring now specifically to FIG. 3, at the beginning of a run or proving cycle using the apparatus 10, the first valve means 32 are opened and the second valve means 34 are closed so that the piston 26 passes into and through the conduit 30 by gravity movement until it comes to rest and is retained by the second valve means 34. When it is desired to commence a proving run, the first valve means 32 are closed so that the disk closure member 38 is positioned adjacent the annular plate 36 and a fluid tight seal therebetween results. As the disk closure member 38 seats against the annular plate 36 liquid within the transfer conduit 30 is trapped between the annular sealing members 76 attached to the disk 38 and the annular plate 36. Continued pressure exerted on the disk closure member 38 by the actuator 44 deforms the elastomer sealing members 76 enough to cause the pressure of the liquid trapped therebetween and communicated to the passageway 80 by the port 78 in the annular plate 36 to be elevated. This elevated pressure is indicated by the pressure gauge 82 so that the operator of the apparatus 10 can compare the pressure between the seals 76 with the pressure of the metered liquid passing through the prover 12. When an elevated pressure is indicated by the pressure gauge 82 the operator is assured that a good seal exists between the disk closure member 38 and the annular plate 36, and that bypassing of liquid through the transfer conduit 30 during the run will not result.

After the closing of the first valve means 32 is completed, the second valve means 34 are opened so that the piston 26 travels by gravity movement through the transfer conduit 30 into the enlarged end portion 14 of the prover barrel 12. The flow of metered liquid through the barrel 12 propels the piston 26 into the intermediate portion 24 thereof and past the first detector switch means 84. As described above, the closure of the first switch means 84 causes the counter 92 to begin recording the pulses generated by the pulse generator 88 attached to the meter 86. The piston 26 flows through the intermediate portion 24 of the barrel 12 and past the second detector switch means 84 which stops the counter so that the actual volume displaced by the piston 26 can be compared with the count produced by the meter 86.

Upon the passage of the piston 26 past the second detector switch means 84, the second valve means 34 are closed. The piston 26 enters the enlarged end portion 16 of the barrel 12 and is deflected into the top portion of the transfer conduit 30 by the deflector bars 28 whereupon it comes to rest against the closed first valve means 32 therein. The first valve means 32 are then opened so that the piston 26 flows by gravity through the transfer conduit 30 until coming to rest and being retained by the second valve means 34. At this point the apparatus 10 is ready to be recycled and another prover run made.

As stated above, the operation of the first and second valve means 32 and 34 is controlled by a central control panel (not shown) which receives signals generated by the toggle switches 54 associated with the first valve means 32, the toggle switches 74 associated with the second valve means 34 and the second detector switch means 84. When the rearward toggle switch 54 of the valve means 32 is tripped to the on position by the activator arm 56 and the forward toggle switch 74 of the valve means 34 is tripped by the activator arm member 72 thereof to the on position, the first valve means 32 are opened, the second valve means 34 are closed, the piston 26 is retained by the second valve means 34 and the apparatus 10 is ready to make a run. The operator of the apparatus 10 activates the control panel which causes the closing of the first valve means 32 whereby the rearward toggle switch 54 is turned off and the forward toggle switch 54 is tripped to the on position by the activator arm 56 as shown in FIG. 2. Upon the tripping or turning on of the forward toggle switch 54 associated with the valve means 32, the control panel opens the second valve means 34 causing the rearward toggle switch 74 associated with the second valve means 34 to be tripped to the on position indicating the start of a prover run. When the valve means 34 are opened, the piston 26 passes by gravity movement through the transfer conduit 30 into the enlarged end portion 14 of he prover barrel 12. As described above, the piston 26 is propelled past the first detector switch means 84, through the intermediate portion 24 of the barrel 12 and past the second detector switch means 84. Upon receipt of the signal produced by the second detector switch means 84, the control panel causes the second valve means 34 to be closed and the forward toggle switch 74 associated theerewith to be tripped to the on position. While the second valve means 34 is closing the first valve means 32 remains closed so that the piston 26 comes to rest and is retained in the top portion of the transfer conduit 30 thereby. When the control panel receives the signal produced by the tripping of the forward toggle switch 74 indicating that the valve means 34 is fully closed, the control panel causes the first valve means 32 to open which allows the piston 26 to be moved by gravity to its initial point whereby it is retained by the valve means 34. When the first valve means 32 is fully opened the rearward toggle switch 54 is tripped indicating that the apparatus 10 is ready for another run.

In order to present a clear understanding of the sequential operation of the first and second valve means 32 and 34, and the function of the toggle switches 54 and 74, and the second detector switch means 84 in controlling such operation, Table I showing the various positions of the valve means 32 and 34 at various times during a prover cycle is set forth below:

bodiments of the apparatus have been described for purposes of this disclosure, numerous changes in the construction and arrangement of parts will be readily apparent to those skilled in the art and the invention is to be limited only by the lawful scope of the appended claims.

What is claimed is:

1. A uni-directional meter prover apparatus which comprises:
   a. a prover barrel having first and second ends, the first end being positioned below the second end thereof;
   b. a piston disposed within said prover barrel which is moved through the barrel by the flow of liquid therethrough;
   c. a metered liquid inlet connection attached to the first end of said prover barrel for introducing metered liquid into said barrel and propelling said piston therethrough;
   d. a displaced liquid outlet connection attached to the second end of said prover barrel for withdrawing liquid displaced by said piston therefrom;
   e. means attached to said barrel for detecting the passage of said piston through said barrel and comparing the volume of liquid displaced thereby with the volume of liquid measured by a meter being proved;
   f. a piston transfer conduit connected between said first and second ends of said prover barrel for conducting said piston by gravity movement from the second end of said prover barrel to the first end thereof;
   g. first valve means disposed within said transfer conduit for preventing liquid communication between the first and second ends of said prover barrel when closed, but allowing the passage of said piston by gravity movement when opened, said first valve means comprising:
   an annular plate sealingly attached within said transfer conduit and positioned transversely to the direction of gravity movement of said piston therethrough, said annular plate including an annular seating surface on the lower side thereof;
   a disk closure member positioned below said annular plate within said transfer conduit and including an annular seating surface on the upper side thereof

TABLE I

| Valve or Switch | VALVE CONTROL AND SWITCHING SEQUENCE | | | |
|---|---|---|---|---|
| | Start of Run | | End of Run | |
| | First Phase | Second Phase | First Phase | Second Phase |
| Valve means 32 | Open to Closed | Closed | Closed | Closed to Open |
| Forward toggle switch 54 | Off to On[1] | On | On | On to Off |
| Rearward toggle switch 54 | On to Off | Off | Off | Off to On[5] |
| Valve means 34 | Closed | Closed to Open | Open to Closed | Closed |
| Forward toggle switch 74 | On | On to Off | Off to On[4] | On |
| Rearward toggle switch 74 | Off | Off to On | On to Off | Off |
| First piston detector switch means 84 | Off | On[2] | On | Off |
| Second piston detector switch means 84 | Off | On[3] | On | Off |

[1] Initiates opening of valve means 34.
[2] Initiates start of counter 92.
[3] Stop counter 92 and initiate closure of valve means 34.
[4] Initiates opening of valve means 32.
[5] Resets piston detector switch means 84 and signals apparatus ready for another proving run.

Thus, the present invention is well adapted to carry out the objects and advantages mentioned as well as those inherent therein. While presently preferred emfor sealingly engaging the annular seating surface of said annular plate;

an actuating rod attached to said disk closure member; and actuator means attached to said actuating rod and to said transfer conduit for moving said disk closure member to alternate positions whereby the annular seating surface of said disk closure member sealingly engages the seating surface of said annular plate or whereby said disk closure member is below said annular plate a distance sufficient to allow the passage of said piston therethrough;

h. second valve means disposed within said transfer conduit below said first valve means for retaining said piston when closed, but allowing the passage of said piston by gravity movement when opened, said second valve means comprising:

an annular plate sealingly attached within said transfer conduit and positioned transversely to the direction of gravity movement of said piston therethrough, said annular plate including an annular seating surface on the lower side thereof;

a disk closure member positioned below said annular plate within said transfer conduit and including an annular seating surface on the upper side thereof for sealingly engaging the annular seating surface of said annular plate;

an actuating rod attached to said disk closure member; and actuator means attached to said actuating rod and to said transfer conduit for moving said disk closure member to alternate positions whereby the annular seating surface of said disk closure member sealingly engages the seating surface of said annular plate or whereby said disk closure member is below said annular plate a distance sufficient to allow the passage of said piston therethrough; and i. means for selectively opening and closing said first and second valve means attached thereto and to said transfer conduit.

2. The apparatus of claim 1 wherein the disk closure member of said first valve means is further characterized to include a pair of spaced apart annular elastomer sealing members attached to the annular seating surface thereof positioned to sealingly engage with the annular seating surface of said annular plate.

3. The apparatus of claim 2 wherein said annular plate of said first valve means disposed within said transfer conduit is further characterized to include:

at least one port disposed in the annular seating surface thereof positioned to lie between said pair of elastomer sealing members attached to said disk closure member when said disk closure member is positioned in seated engagement with said annular seating surface;

a passageway disposed in said annular plate and in said transfer conduit communicating said port to the outside of said transfer conduit; and means for indicating the pressure exerted through said port and within said passageway sealingly attached to said passageway.

4. In a uni-directional meter prover apparatus which includes a prover barrel having first and second ends, a piston disposed within said barrel which is propelled through the barrel by the flow of liquid therethrough, means for detecting the passage of said piston and comparing the volume of liquid displaced thereby with the volume of liquid measured by a meter being proved, and means for transferring said piston from the second end of said prover barrel to the first end thereof, the improvement which comprises:

a. the first end of said prover barrel being positioned below the second end thereof;

b. a piston transfer conduit connected between said first and second ends of said prover barrel for conducting said piston by gravity movement from the second end of said prover barrel to the first end thereof;

c. first valve means disposed within said transfer conduit for preventing liquid communication between the first and second ends of said prover barrel when closed, but allowing the passage of said piston by gravity movement therethrough when opened, said first valve means comprising:

an annular plate sealingly attached within said transfer conduit and positioned transversely to the direction of gravity movement of said piston therethrough, said annular plate including an annular seating surface on the lower side thereof;

a disk closure member positioned below said annular plate within said transfer conduit and including an annular seating surface on the upper side thereof for sealingly engaging the annular seating surface of said annular plate;

an actuating rod attached to said disk closure member; and actuator means attached to said actuating rod and to said transfer conduit for moving said disk closure member to alternate positions whereby the annular seating surface of said disk closure member sealingly engages the seating surface of said annular plate or whereby said disk closure member is below said annular plate a distance sufficient to allow the passage of said piston therethrough;

d. second valve means disposed within said transfer conduit below said first valve means for retaining said piston when closed, but allowing the passage of said piston therethrough by gravity movement when opened, said second valve means comprising:

an annular plate sealingly attached within said transfer conduit and positioned transversely to the direction of gravity movement of said piston therethrough, said annular plate including an annular seating surface on the lower side thereof;

a disk closure member positioned below said annular plate within said transfer conduit and including an annular seating surface on the upper side thereof for sealingly engaging the annular seating surface of said annular plate;

an actuating rod attached to said disk closure member; and actuator means attached to said actuating rod and to said transfer conduit for moving said disk closure member to alternate positions whereby the annular seating surface of said disk closure member sealingly engages the seating surface of said annular plate or whereby said disk closure member is below said annular plate a distance sufficient to allow the passage of said piston therethrough;

e. means for opening and closing said first and second valve means attached thereto and to said transfer conduit; and f. means for controlling the operation of said means for opening and closing said first and second valve means so that when said piston is retained in said transfer conduit by said second valve means and said control means are activated, said first valve means are closed to prevent liquid communication between the first and second ends of said prover barrel, said second valve means are opened so that said piston is launched by gravity movement into said prover barrel after said first valve means are closed, said second valve means are closed after the passage of said piston through said barrel is detected, and then said first valve means are opened whereby said piston is transferred by gravity movement into said transfer conduit and it again retained therein by said closed second valve means.

5. The apparatus of claim 4 wherein the disk closure member of said first valve means is further characterized to include a pair of spaced apart annular elastomer sealing members attached to the annular seating surface thereof positioned to sealingly engage with the annular seating surface of said annular plate.

6. The apparatus of claim 5 wherein said annular plate of said first valve means disposed within said transfer conduit is further characterized to include:
- at least one port disposed in the annular seating surface thereof positioned to lie between said pair of elastomer sealing members attached to said disk closure member when said disk closure member is positioned in seated engagement with said annular seating surface;
- a passageway disposed in said annular plate and in said transfer conduit communicating said port to the outside of said transfer conduit; and
- means for indicating the pressure exerted through said port and within said passageway sealingly attached to said passageway.

* * * * *